UNITED STATES PATENT OFFICE.

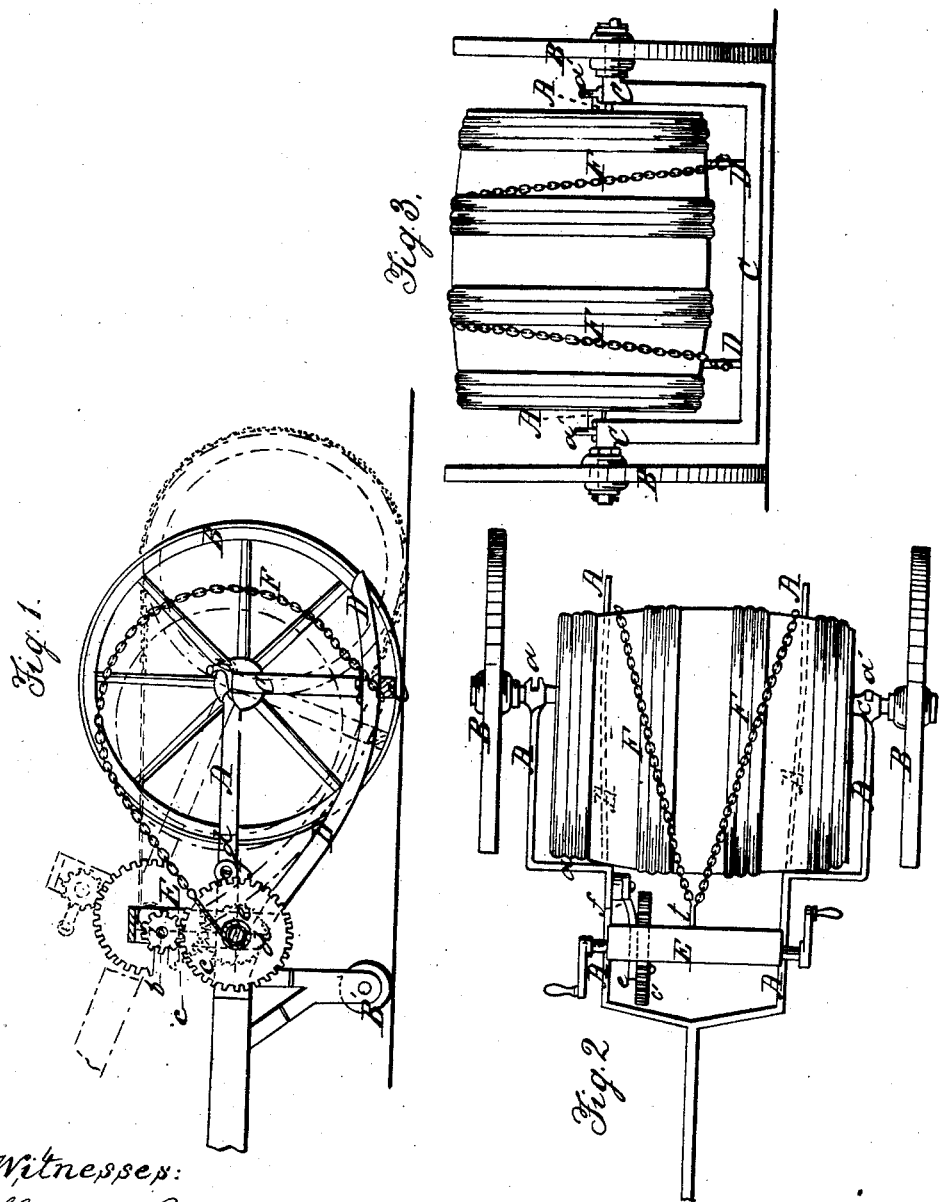

MARTIN L. SENDERLING, OF JERSEY CITY, NEW JERSEY.

IMPROVEMENT IN TRUCKS FOR TRANSPORTING CASKS.

Specification forming part of Letters Patent No. 45,643, dated December 27, 1864.

*To all whom it may concern:*

Be it known that I, M. L. SENDERLING, of Jersey City, in the county of Hudson and State of New Jersey, have invented a new and useful Improvement in Trucks for Transporting Casks; and I do hereby declare that the following is a full, clear, and exact description of the same, reference being had to the accompanying drawings, forming part of this specification, in which—

Figure 1 is a longitudinal vertical section of the truck, showing the same in two positions. Fig. 2 is a plan view of the same. Fig. 3 is a back view of the same.

Similar letters indicate corresponding parts in the several figures.

The object of my invention is to facilitate the removal of heavy casks from one place to another without the necessity of raising the same to any considerable height from the ground; and to this end it consists in a truck which has its axle bent down in a crank-like shape nearly close to the ground, to allow the cask to be run in between the wheels on narrow runners, which extend some distance rearward beyond the axle, and are connected with the front end of the frame of the truck, on which there is a windlass for drawing or rolling up the cask onto the runners by winding up a chain or chains, which are fastened at one end to the lower part of the axle at the junction of the runners, and connected with the windlass, passing around the body of the cask.

To enable others skilled in the art to construct trucks according to my invention, I will proceed to describe it with reference to the drawings.

A is a horizontal frame rigidly fastened to the axle C. This frame is so constructed (open at the rear) as to allow the cask to be run up within it, as seen at $a$ in Figs. 1 and 2.

B B are the main wheels, as used in other trucks, fitted loosely to the axle C. This axle is so bent downward near the wheels in a crank-like shape as to come nearly close to the ground, as plainly shown in Fig. 3; and the frame A is connected with the said axle close to the wheels. On top of the lower part of the axle are the two narrow curved runners D D, extending nearly parallel with and at a suitable distance from each other from the front part of the frame A to some distance in rear of the axle, and rigidly fastened both to the frame and the axle.

E is a windlass firmly secured upon the front part of the frame A, having two cranks, $b\ b$, gears $c\ c'$, barrel $d$, ratchet-wheel $e$, and pawl $f$, by means of which the chain F is drawn up, the said chain F being connected with a rope, $l$, winding upon the barrel $d$.

B' is a small front wheel for supporting the front end of the truck when loaded. Hooks $a'$ are used for gathering up chain F when the truck is empty, as the chain would drag behind. The ends of the chain are secured to the frame A, and it is connected at the middle of its length with the rope $l$. The front part of the frame A has a tongue, A, to enable it to be drawn by horses, cattle, or men.

The operation is as follows: The truck is run back to the cask to bring the rear ends of the runners D D under the cask, as shown in red outline in Fig. 1, the truck being raised up in front sufficiently high to cause the ends of the runners to touch the ground. The chain F is then brought over the back of and around the cask, and the windlass E is now set in motion by turning the crank-shaft $b$, by hand, and so made to wind up the rope $l$, and draw forward the upper part of the chain F, thereby rolling the cask forward onto the runners and within the crank of the axle. As soon as the cask is fairly on the runners, the front end of the frame drops and brings the front wheel, B', on the ground. The cask, having been drawn or rolled forward up to the part $a$ of the frame A, is secured by the ratchet-wheel and pawl of the windlass, and the truck may then be drawn to the place where it is desired to be transported. The cask is allowed to roll off the truck by releasing the pawl from the ratchet-wheel, and turning the crank-shaft of the windlass in a direction to unwind the rope $l$, the front end of the truck being lifted up the cask passes the axle to let the rear ends of the runners come on the ground and give the rear portions thereof a proper descent.

The advantage of this truck consists in the facility afforded for loading and unloading, owing to the small distance to which the cask has to be raised up from the ground.

What I claim as my invention, and desire to secure by Letters Patent, is—

The bent or crank-axle C, runners D D, and windlass E, in combination with each other and with the frame A, open at its rear end, substantially as herein specified.

MARTIN L. SENDERLING.

Witnesses:
HENRY T. BROWN,
J. W. COOMBS.